US012764232B2

(12) United States Patent
Homorodi et al.

(10) Patent No.: US 12,764,232 B2
(45) Date of Patent: Oct. 13, 2026

(54) ENHANCING VOICEMAIL ACCESSIBILITY FOR MOBILE VIRTUAL NETWORK OPERATORS (MVNO) USERS THROUGH A MEDIA STORAGE SYSTEM

(71) Applicant: T-Mobile USA, Inc., Bellevue, WA (US)

(72) Inventors: Zoltan Homorodi, North Bend, WA (US); Sean P. Hoelzle, Collegeville, PA (US); Salman Karimpour Ahmadi, Mill Creek, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 316 days.

(21) Appl. No.: 18/438,056

(22) Filed: Feb. 9, 2024

(65) Prior Publication Data

US 2025/0260769 A1 Aug. 14, 2025

(51) Int. Cl.
*H04W 4/12* (2009.01)
*H04M 3/533* (2006.01)

(52) U.S. Cl.
CPC ........... *H04M 3/5335* (2013.01); *H04W 4/12* (2013.01)

(58) Field of Classification Search
CPC .... H04M 3/5335; H04M 3/533; H04M 3/537; H04W 4/12
USPC .......................................................... 455/413
See application file for complete search history.

(56) References Cited

U.S. PATENT DOCUMENTS

2008/0305803 A1* 12/2008 Long ........................ H04W 4/12 455/445
2009/0156176 A1* 6/2009 Hao .................. H04M 3/53325 455/413
2015/0281459 A1* 10/2015 Guo .................. H04M 3/53366 370/259
2015/0326727 A1* 11/2015 Desai ....................... H04L 67/04 455/412.2
2019/0207935 A1* 7/2019 Poovappa ............. H04L 63/123
2024/0205686 A1* 6/2024 Sharma ................. H04W 12/06

* cited by examiner

*Primary Examiner* — Don N Vo
(74) *Attorney, Agent, or Firm* — Lee & Hayes, P.C.

(57) ABSTRACT

Systems and methods for providing access of a media storage system for Mobile Virtual Network Operators (MVNO) users are described herein. The media storage system may receive a voicemail deposit request from a MVNO. The voicemail deposit request may include the recorded voicemail for the user and a profile identifier associated with the user. The profile identifier may be used to determine whether the user has access to the media storage system. Upon confirming that the user has access to the media storage system, the recorded voicemail may be stored on the media storage system. The media storage system may generate a first notification to inform the user of the existence of the stored voicemail and transmit the first notification to the user device, thereby alerting the user of the new voicemail and facilitating its retrieval.

20 Claims, 8 Drawing Sheets

ENHANCING VOICEMAIL ACCESSIBILITY FOR MOBILE VIRTUAL NETWORK OPERATORS (MVNO) USERS THROUGH A MEDIA STORAGE SYSTEM

BACKGROUND

Mobile communication devices have become an integral part of modern life, providing users with a wide range of functionalities and services. Among these services, voicemail plays a crucial role in enabling users to receive and manage voice messages. However, the landscape of mobile network services includes Mobile Virtual Network Operators (MVNOs), which provide their own voicemail systems that are often not seamlessly integrated into the user's device operating system. This lack of integration presents a significant challenge to users who wish to access and manage their voicemail efficiently.

Traditional voicemail systems are typically tied to the user's mobile network provider and are designed to work seamlessly with the native voicemail applications integrated into most devices. Users can conveniently access and manage their voicemails through these applications. However, MVNOs, as separate entities, may operate distinct voicemail systems that are not natively integrated with the device's operating system. This disconnect results in users being unable to access the native voicemail application on their mobile devices when using MVNO services. This limitation creates inconvenience and inefficiency for users, as they are forced to rely on separate, non-integrated voicemail systems provided by MVNOs. These non-native voicemail systems may not offer the same level of accessibility, user experience, and convenience as the device's native voicemail application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
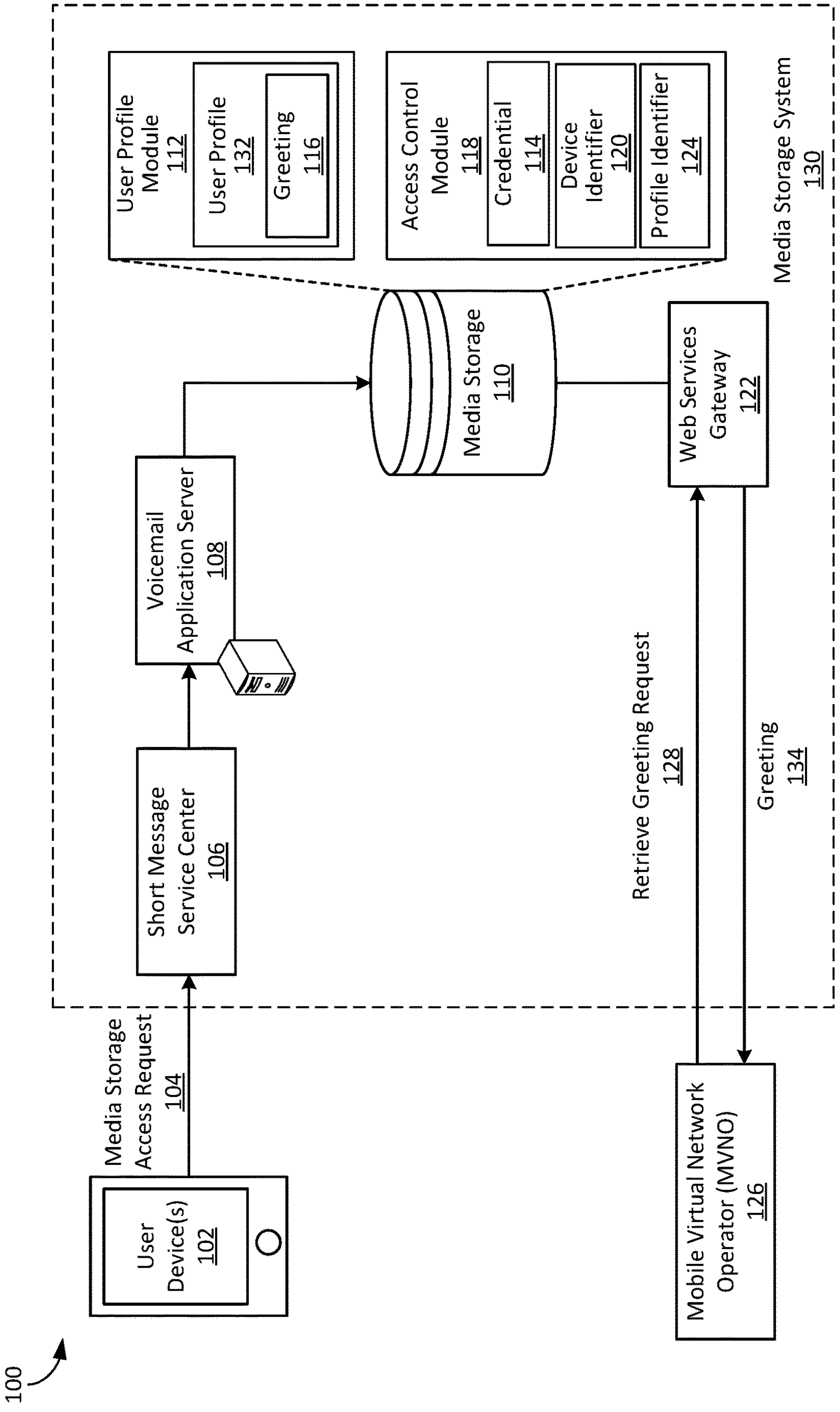
FIG. 1 illustrates a telecommunication system that enables a MVNO user to set up a voicemail credential with a media storage system and provides voicemail accessibility for the MVNO user.

This disclosure describes systems, devices, and techniques for enhancing voicemail accessibility for MVNO users. This innovation allows MVNO users to access and manage their voicemails through a media storage system, thereby overcoming the limitations of existing MVNO voicemail systems.

In some examples, a media storage system may receive a media storage access request from a user device associated with an MVNO, which includes a device identifier associated with the user device. The media storage system may set up a voicemail credential for a user associated with the user device by storing the device identifier on the media storage system. Additionally, the media storage system may receive a credential (e.g., a personal identification number) or a greeting message provided by a user of the user device and store the credential or the greeting message on the media storage system.

In some examples, the media storage system may receive a voicemail deposit request from a MVNO. For example, when a user misses a call, a far end caller may record a voicemail for the user and the MVNO generate a request to send the recorded voicemail to the media storage system. The voicemail deposit request may include the recorded voicemail for the user and a profile identifier associated with the user. The profile identifier may be used to determine whether the user has access to the media storage system. Upon confirming that the user has access to the media storage system, the recorded voicemail may be stored on the media storage system. The media storage system may generate a first notification to inform the user of the existence of the stored voicemail and transmit the first notification to the user device, thereby alerting the user of the new voicemail and facilitating its retrieval.

In some examples, the media storage system may receive a request to retrieve the stored voicemail from the user device. Upon receiving a request from the user device, the media storage system may transmit the requested voicemail to the user device, ensuring seamless access and integration. Subsequently, in response to successfully delivering the requested voicemail to the user device, the media storage system may generate a second notification indicating the requested voicemail has been synchronized and is now accessible on the user device. The media storage system may then transmit the second notification to the user device to ensure that the user is informed in a timely manner. In some examples, additional security measurements may be used to prevent others to access the voicemail in case the user lost the user device. For example, upon receiving the request to retrieve the stored voicemail, the media storage system may send a PIN request to the user device. The media storage system may further receive a PIN from the user device and uses this information to authenticate the user associated with the user device. This additional layer of security helps safeguard communication and ensures that only authorized users can access the media storage system.

In some examples, the media storage system not only receives requests from the user devices but also facilitates interaction with the MVNO. Upon receiving a request to retrieve a voicemail from the MVNO, the media storage system may transmit the requested voicemail to the MVNO, ensuring the user has access to the requested voicemail. As part of this process, the media storage system may generate a second notification to affirm the successful transmission of the voicemail to the MVNO. The media storage system may then transmit the second notification to the user device to provide the user with real-time updates on the status of the voicemail request and retrieval process.

In some examples, the media storage system may receive a request to delete a stored voicemail. Upon receiving a user's request to delete the stored voicemail, the media storage system may promptly remove the specified voicemail from the media storage, enhancing data management and user control. Subsequently, a second notification may be generated to acknowledge the successful removal of the voicemail. The media storage system may further transmit the second notification to the user device to ensure the user is promptly informed of this action. This feature enriches the user experience by allowing the user to manage his or her stored voicemail efficiently and stay informed about changes to data.

The present invention provides a novel solution by introducing a method and system for setting up voicemail credentials and providing access of a media storage system for MVNO users. This innovation allows MVNO users to access and manage their voicemails through a media storage system, thereby overcoming the limitations of existing MVNO voicemail systems. By providing access of the media storage system to MVNO users and providing timely notifications, the media storage system improves the accessibility and user experience of voicemail services for MVNO users and bridges the gap between MVNO-specific voicemail systems and the native visual voicemail applications integrated into user devices.

FIG. 1 illustrates an example telecommunication system 100, which may enable a MVNO user to set up a voicemail credential with a media storage system and may provide voicemail accessibility for the MVNO user. More particularly, FIG. 1 may illustrate example operations of the telecommunication system 100 for registering a user device with a media storage system 130. The telecommunication system 100 may include user device(s) 102, a media storage system 130, and a mobile virtual network operator (MVNO) 126. In some examples, the media storage system 130 may include a short message service center 106, a voicemail application server 108, a media storage 110, and a web services gateway 122.

The various network components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future network technology or evolution of an existing network technology (e.g., IP or Non-IP based). These are merely examples and the various network components described herein, may be capable of communicating via one or more of a 3G, 4G, 4G LTE, and/or 5G protocols.

The user device(s) 102 may communicate with the carrier network components using an access network (not shown), which may comprise a cellular communication network or other type of wired or wireless network. Examples of wireless access networks include LTE, NR, WIFI, GSM EDGE Radio Access Network (GERAN), UMTS Terrestrial Radio Access Network (UTRAN), and other cellular access networks.

In some examples, the media storage system 130 (e.g., a core network) may receive a media storage access request 104 from the user device(s) 102. In some examples, the media storage access request may include a device identifier 120 (e.g., an international mobile equipment identity (IMEI)) associated with the user device(s) 102. In some examples, the media storage access request may include a credential 114 (e.g., PIN) and/or a greeting message 116 provided by a user of the user device(s) 102. In one example, when a user enables native voicemail, the user may cause the user device(s) 102 to send an activation SMS to a specific short code which is received at the short message service center 106. The short message service center 106 may forward the activation to the voicemail application server 108 and the voicemail application server 108 may forward the activation to a user profile module 112. Once the activation has been received by the user profile module 112, the user profile module 112 may query the media storage 110 to retrieve information associated with the user device(s) 102 based on the device identifier 120. If the user profile module 112 determines the device identifier 120 associated with the user device(s) 102 is stored on the media storage 110, the user profile module 112 may return the voicemail application server 108 user profile information associated with the user device(s) 102. The voicemail application server 108 may further send a request to the short message service center 106 to cause the short message service center 106 to generate a SMS message indicating the user device(s) 102 already have access to the media storage system 130. If the user profile module 112 determines the device identifier 120 associated with the user device(s) 102 is not stored on the media storage 110, the user profile module 112 may forward the device identifier 120 and the credential 114 to an access control module 118. The access control module may store the device identifier 120 and the credential 114 in the media storage 110. The access control module 118 may further generate a profile identifier 124 indicating the user and associated the profile identifier 124 with the device identifier 120. The user profile module 112 may generate a user profile 132 associated with the profile identifier 124 and store the greeting 116 within the user profile 132.

In some examples, the MVNO 126 may periodically generate a request 128 to retrieve the greeting 116. The MVNO 126 may send the request 128 to the web services gateway 122 and the web services gateway 122 may forward the request 128 to the user profile module 112. The request 128 may include a profile identifier associated with the user and the user profile module 112 may query the media storage 110 to retrieve the greeting 134 based at least in part on the profile identifier. The user profile module 112 may then forward the retrieved greeting 134 back to the web services gateway 122 and the web services gateway 122 may forward the retrieved greeting 134 to the MVNO 126. For example, when a user misses a call, the MVNO 126 may generate a request to retrieve the greeting associated with the user from the media storage system 130 as described above. The media storage system 130 may forward to greeting to the MVNO 126, and the MVNO 126 may cause the user's greeting to be played to the far end caller.

Figure 2:
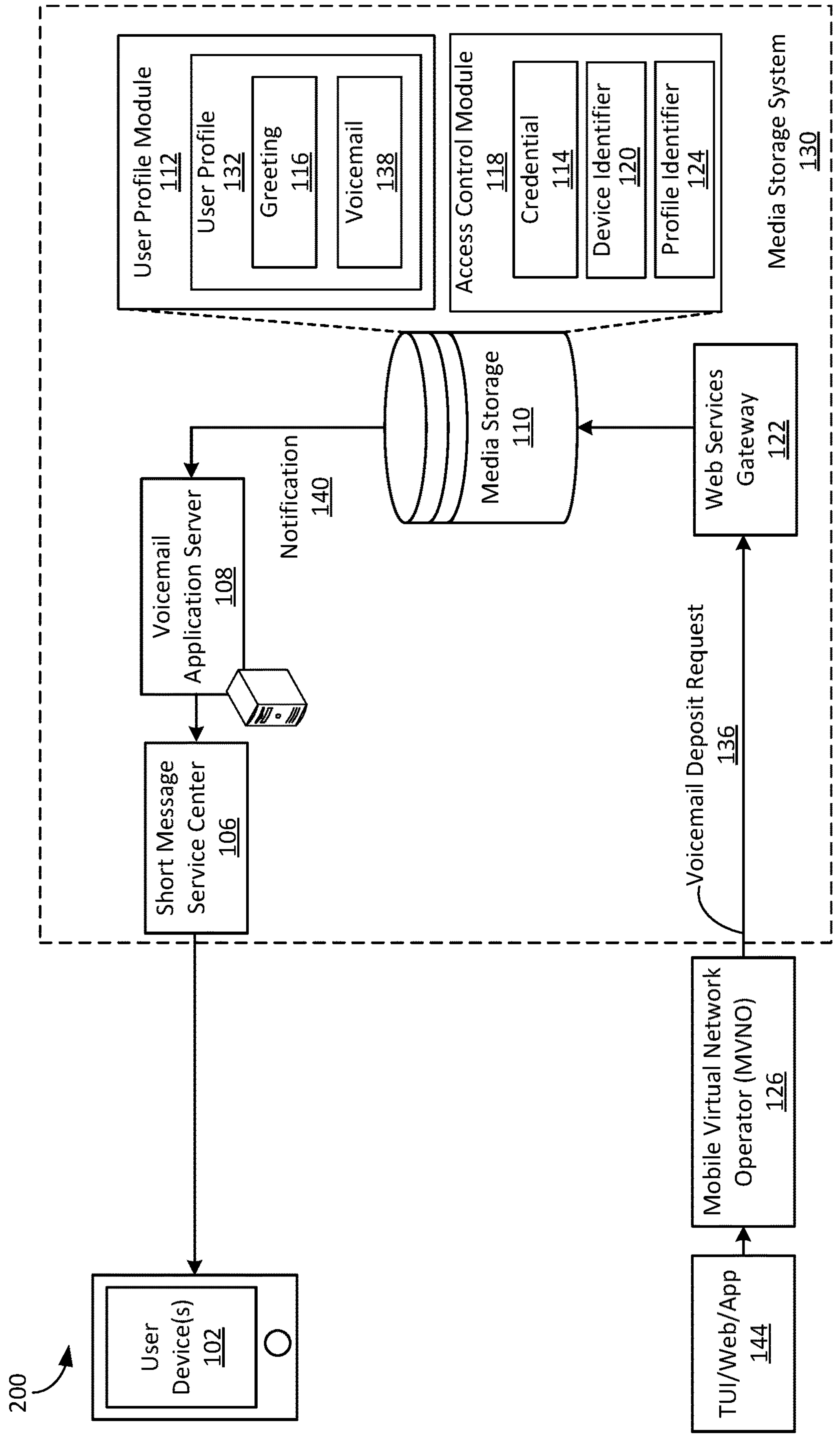
FIG. 2 illustrates a telecommunication system that enables a voicemail to be deposited from an MVNO to a media storage system.

FIG. 2 illustrates a telecommunication system 200 that enables a voicemail to be deposited from the MVNO 126 to the media storage system 130.

In some examples, the media storage system 130 (e.g., a core network) may receive a voicemail deposit request 136 from the MVNO 126. For example, when a user misses a call, a far end caller may record a voicemail for the user and the MVNO 126 generate a request to send the recorded voicemail to the media storage system 130. Alternatively or additionally, a request to deposit a voicemail may be received through an out of band device 144, such as from a third-party application lacking visual voicemail on the out of band device 144. By enabling third-party applications to leverage the media storage system 130, the telecommunication system 200 enables users to centralize their voicemails through the media storage system 130, providing a unified and convenient user experience across multiple sources. This provides the users the ability to manage their voicemails from various sources through the media storage system 130, streamlining communication and enhancing accessibility.

Upon receiving the voicemail, the MVNO 126 may generate a voicemail deposit request 136 indicating request to store a voicemail 138 to the media storage system 130. The voicemail deposit request 136 may include the voicemail 138 to be stored on the media storage system 130 and the profile identifier 124 associated with a user of the media storage system 130 (e.g., a receiver of the voicemail). The MVNO 126 may send the voicemail deposit request 130 to the web services gateway 122 and the web services gateway 122 may forward the voicemail deposit request 130 to the access control module 118. The access control module 118 may query the media storage 110 to check if the user associated with the voicemail deposit request 136 has access to the media storage system 130. For example, the access control module 118 may receive the profile identifier 124 associated with the voicemail deposit request 136 and check if the profile identifier 124 is saved in media storage 110. If the access control module 118 determines the user does not have access to the media storage system 130, the operations may terminate with an error. Otherwise, the access control module 118 may forward the voicemail deposit request 136 to the user profile module 112 and the user profile module 112 may store the received voicemail 138 on the media storage 110. For example, the user profile module 112 may identify the user profile 132 associated with the user based on the profile identifier 124 and store the received voicemail within the user profile 132.

In some examples, upon storing the received voicemail 110, the media storage system 130 may generate a notification 140 to inform the user of the existence of the stored voicemail 138 and transmit the notification 140 to the user device(s) 102 associated with the user, thereby alerting the user of the new voicemail 140 and facilitating its retrieval. For example, the voicemail application server 108 may send a SMS notification 140 containing voicemail status and information associated with the user device(s) 102 to the short message service center 106. The short message service center 106 may deliver the SMS notification 140 received from the voicemail application server 108 to the user device(s) 102. The notification 140 may alert the user of the new voicemail 138 and provide instruction for its retrieval.

Figure 3:
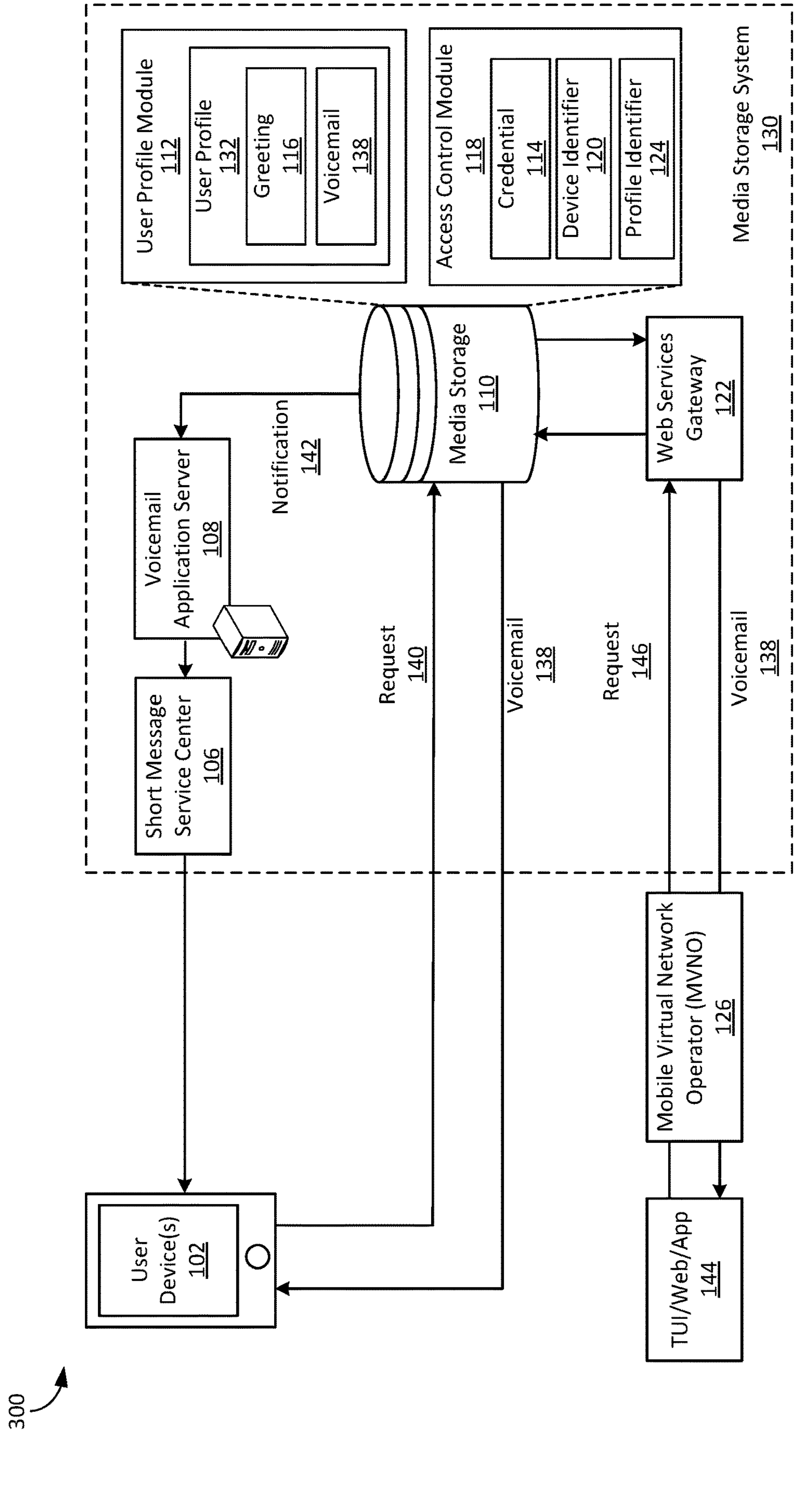
FIG. 3 illustrate a telecommunication system that enables a MVNO user to access voicemails through a media storage system.

FIG. 3 illustrate a telecommunication system 300 that enables a user of MVNO 126 to retrieve a voicemail through a media storage system 130.

In some examples, the media storage system 130 may receive a request to retrieve a stored voicemail from the user device(s) 102. For example, upon receiving a notification indicating a new voicemail, a user may cause the user device(s) 102 to send a request 140 to retrieve a voicemail 138 from the media storage system 130. In some examples, the request 140 may include the device identifier 120 (e.g., IMEI) indicating the user device(s) 102 associated with the user or the profile identifier 124 indicating the identity of the user. The user profile module 112 may receive the device identifier 120 or the profile identifier 124 associated with the request 140 and identify the user profile 132 associated with the user based on the device identifier 120 or the profile identifier 124. The user profile module 112 may then retrieve the requested voicemail from the user profile 132 and forward the requested voicemail 138 to the user device(s) 102.

In some examples, additional security measurements may be used to prevent others to access the voicemail in case the user lost the user device(s) 102. For example, upon receiving the request 140 to retrieve the stored voicemail 138, the media storage system 130 may send a PIN request to the user device(s) 102. The media storage system 130 may further receive the PIN associated with the user device(s) 102 and uses this information to authenticate the user associated with the user device(s) 102. This additional layer of security helps safeguard communication and ensures that only authorized users can access the media storage system 130.

In response to successfully delivering the requested voicemail 138 to the user device(s) 102, the media storage system 130 may generate a notification 142 indicating the requested voicemail 138 has been delivered and is now accessible on the user device(s) 102. For example, the voicemail application server 108 may send a SMS notification 142 containing voicemail status and information associated with the user device(s) 102 to the short message service center 106. The short message service center 106 may deliver the SMS notification 140 received from the voicemail application server 108 to the user device(s) 102. The notification 140 may notify the user that the voicemail 138 is now available on the user device(s) 102.

In some examples, the media storage system 130 not only receives requests from the user device(s) 102 but also facilitates interaction with the MVNO 126. For example, a user may provide a request 146 to retrieve the voicemail 138 through an out of band device 144, such as via a web interface displayed by another device and so on. When the MVNO 126 receives the request 146 to retrieve the voicemail 138 from the out of band device 144, the MVNO 126 may forward the request 146 to the web services gateway 122 and the web services gateway 122 may forward the request 146 to the user profile module 112 to retrieve the voicemail 138. The request 146 may include a profile identifier associated with the user and the user profile module 112 may query the media storage 110 to retrieve the voicemail 138 associated with the profile identifier included in the request 148. The user profile module 112 may forward the retrieved voicemail 138 back to the web services gateway 122, and the web services gateway 122 may further forward the voicemail 138 to the MVNO 126. The MVNO 126 may cause the voicemail 138 to be delivered to the out of band device 144.

In response to successfully delivering the requested voicemail 138 to the out of band device 144, the media storage system 130 may generate a notification 142 indicating the requested voicemail 138 has been delivered. For example, the voicemail application server 108 may send a SMS notification 142 containing voicemail status and information associated with the user device(s) 102 to the short message service center 106. The short message service center 106 may deliver the SMS notification 140 received from the voicemail application server 108 to the user device(s) 102. The notification 140 may notify the user that the voicemail 138 has been delivered to the out of band device 144.

In some examples, the media storage system 130 may receive a request to delete a stored voicemail. As described above, the request may be received from the user device(s) 102 or the out of band device 144. Upon receiving the request to delete the voicemail, the media storage system 130 may remove the voicemail and generate a notification indicating the voicemail has been removed. In some examples, the notification may be delivered to the user device(s) 102 via a SMS message.

Figure 4:
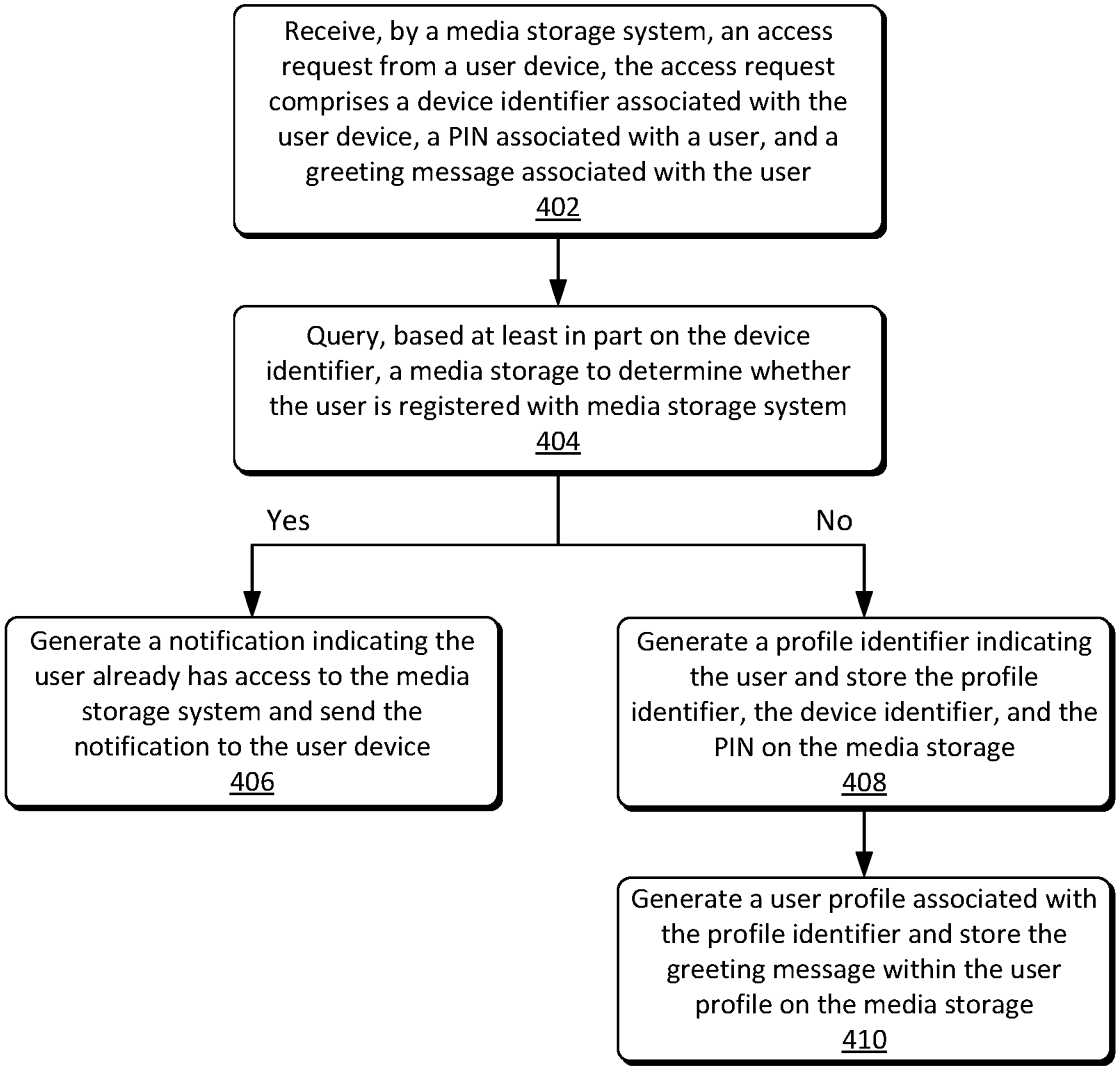
FIG. 4 illustrates a flowchart of a method for setting up a voicemail credential with a media storage system.

FIG. 4 illustrates a flowchart of a method for setting up a voicemail credential with a media storage system.

At block 402, a media storage system may receive an access request from a user device. The access request may include a device identifier (e.g., IMEI) associated with the user device. Additionally, in some examples, the access request may include a PIN and greeting message provided by a user of the user device.

At block 404, the media storage system may query, based at least in part on the device identifier, a media storage to determine whether the user is registered with the media storage system.

If the media storage system determines that the user is registered with the media storage system (Yes at block 404), the media storage system may generate a notification indicating the user already has access to the media storage system and send the notification to the user device at block 406.

If the media storage system determines that the user is not registered with the media storage system (No at block 404), the media storage system may generate a profile identifier indicating the user and store the profile identifier, the device identifier, and the PIN on the media storage at block 408.

At block 410, the media storage system may generate a user profile associated with the profile identifier and store the greeting message within the user profile on the media storage.

Figure 5:
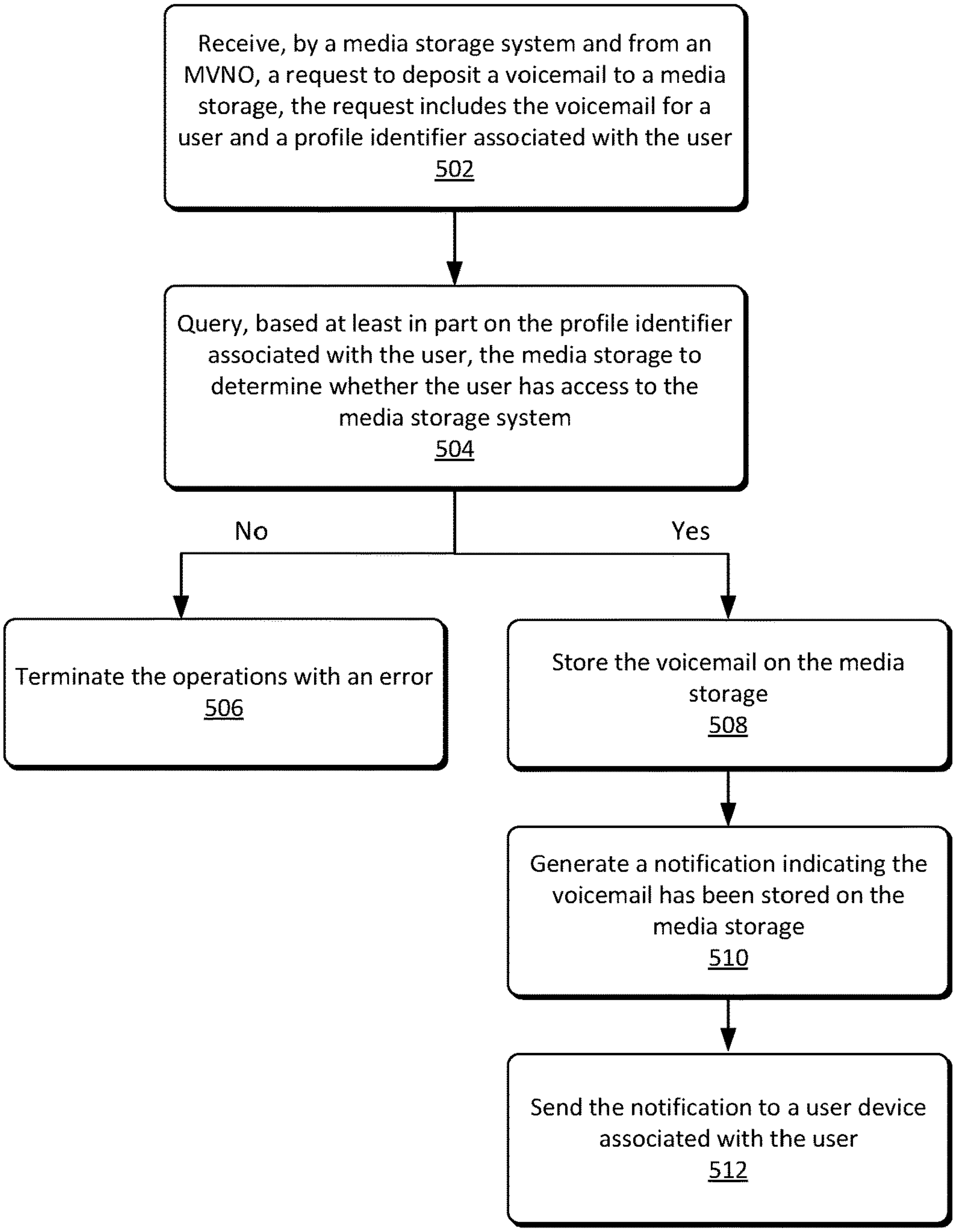
FIG. 5 illustrates a flowchart of a method for storing a voicemail deposited from an MVNO to a media storage system and providing a notification indicating the voicemail has been deposited.

FIG. 5 illustrates a flowchart of a method for storing a voicemail deposited from an MVNO to a media storage system and providing a notification indicating the voicemail has been deposited.

At block 502, the media storage system may receive, from an MVNO, a request to deposit a voicemail to a media storage. For example, when a user misses a call, a far end caller may record a voicemail for the user and the MVNO generate a request to store the recorded voicemail on the media storage. In some examples, the request includes the voicemail for the user and a profile identifier associated with the user.

At block 504, the media storage system may query, based at least in part on the profile identifier associated with the user, the media storage to determine whether the user has access to the media storage system.

If the media storage system determines the user does not have access to the media storage system (No at block 504), the media storage system may terminate the operations with an error at block 506.

If the media storage system determines the user has access to the media storage system (Yes at block 504), the media storage system may store the voicemail on the media storage at block 508. For example, an access control module of the media storage system may receive the profile identifier associated with the voicemail deposit request and check if the profile identifier is saved in media storage. Based on determining the profile identifier is saved in media storage, a user profile module of the media storage system may store the received voicemail within a user profile associated with the profile identifier.

At block 510, the media storage system may generate a notification indicating the voicemail has been stored on the media storage.

At block 512, the media storage system may send the notification to a user device associated with the user. For example, a voicemail application server of the media storage system may send a SMS notification containing voicemail status and information associated with the user device to a short message service center of the media storage system. The short message service center may deliver the SMS notification received from the voicemail application server to the user device associated with the user to alert the user of the new voicemail and provide instruction for its retrieval.

Figure 6:
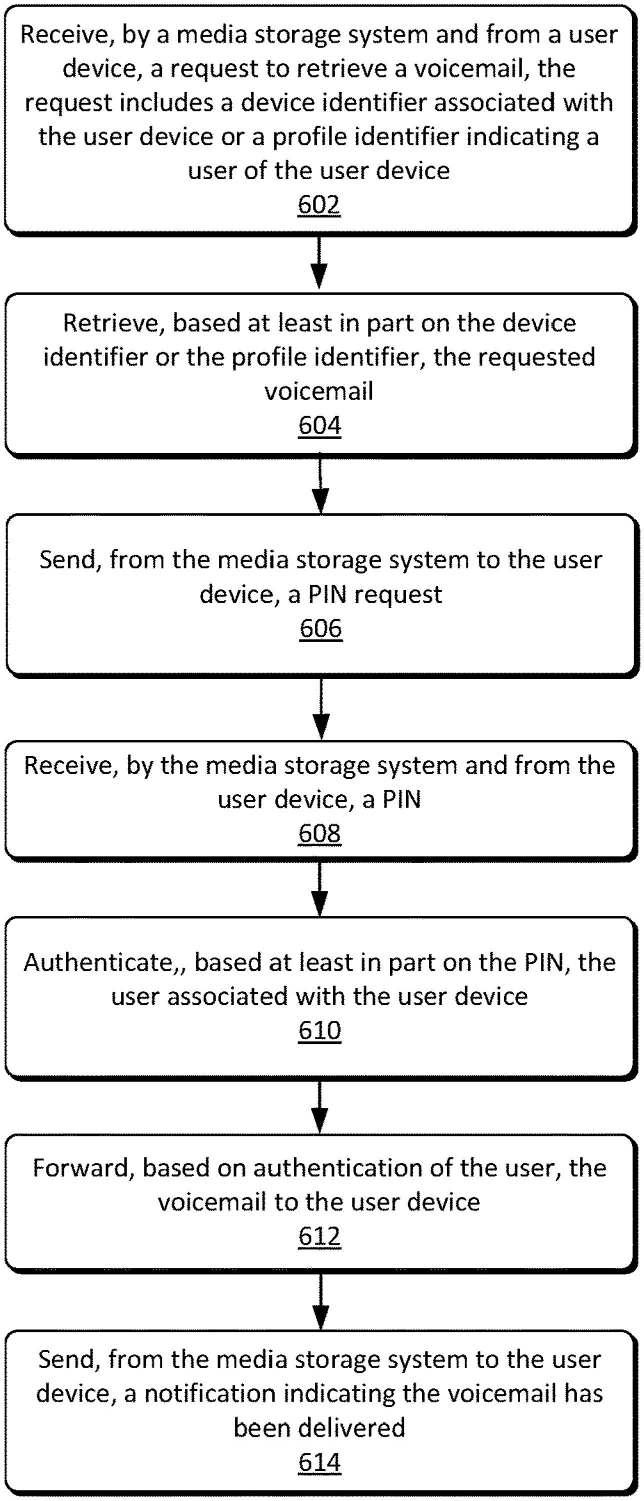
FIG. 6 illustrates a flowchart of a method for authenticating a user of a user device, providing a requested voicemail to the user device, and providing a notification to the user device indicating the voicemail has been delivered.

FIG. 6 illustrates a flowchart of a method for authenticating a user of a user device, providing a requested voicemail to the user device, and providing a notification to the user device indicating the voicemail has been delivered.

At block 602, a media storage system may receive, from a user device, a request to retrieve a voicemail. For example, upon receiving a notification indicating a new voicemail, a user may cause the user device to send the request to retrieve the new voicemail from the media storage system. In some examples, the request may include a device identifier associated with the user device or a profile identifier indicating the user.

At block 604, the media storage system may retrieve, based at least in part on the device identifier or the profile identifier, the requested voicemail. For example, a user profile module of the media storage system may receive the device identifier or the profile identifier associated with the request and identify a user profile based on the device identifier or the profile identifier. The user profile module may then retrieve the requested voicemail from the user profile.

At block 606, the media storage system may send a PIN request to the user device.

At block 608, the media storage system may receive a PIN from the user device.

At block 610, the media storage system may authenticate the user associated with the user device based at least in part on the PIN. This additional security measurements can be used to prevent others to access the voicemail in case the user lost the user device.

At block 612, the media storage system may forward the voicemail to the user device based on authentication of the user.

At block 614, the media storage system may send a notification to the user device indicating the voicemail has been delivered. For example, a voicemail application server of the media storage system may send a SMS notification containing voicemail status and information associated with the user device to the short message service center of the media storage system. The short message service center may deliver the SMS notification received from the voicemail application server to the user device. The notification may notify the user that the voicemail is now available on the user device.

Figure 7:
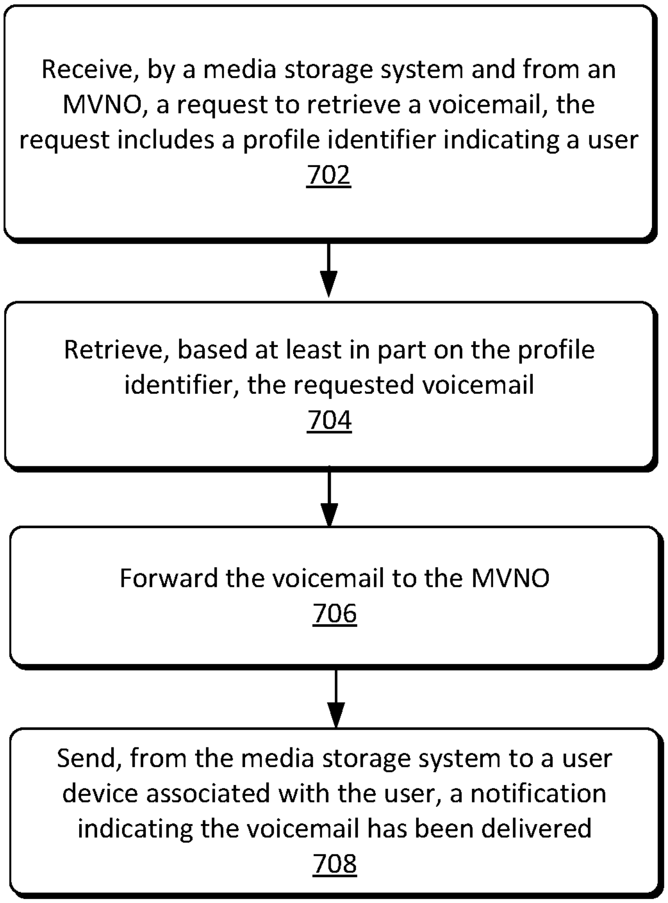
FIG. 7 illustrates a flowchart of a method of providing a requested voicemail to an MVNO and providing a notification to a user device indicating the voicemail has been delivered.

FIG. 7 illustrates a flowchart of a method of providing a requested voicemail to an MVNO and providing a notification to a user device indicating the voicemail has been delivered.

At block 702, the media storage system may receive, from an MVNO, a request to retrieve a voicemail. For example, a user may provide a request to retrieve the voicemail through an out of band device, such as via a web interface displayed by another device. When the MVNO receives the request to retrieve the voicemail, the MVNO may forward the request to a web services gateway of the media storage system. In some examples, the request may include a profile identifier associated with the user.

At block 704, the media storage system may retrieve the requested voicemail based at least in part on the profile identifier. For example, the web services gateway of the media storage system may forward the request to a user profile module of the media storage system, and the user profile module of the media storage system may query a media storage to identify a user profile associated with the profile identifier and retrieve the requested voicemail from the user profile.

At block 706, the media storage system may forward the retrieved voicemail to the MVNO. For example, the user profile module may forward the retrieved voicemail to a web services gateway of the media storage system, and the web services gateway may further forward the voicemail to the MVNO. In some examples, the MVNO may cause the voicemail to be delivered to the out of band device.

At block 708, the media storage system may send a notification to a user device assoicated with the user indicating the voicemail has been delivered. For example, a voicemail application server of the media storage system may send a SMS notification containing voicemail status and information associated with a user device of the user to a short message service center of the media storage system. The short message service center may deliver the SMS notification to the user device. The notification may notify the user that the voicemail has been delivered to the out of band device.

Figure 8:
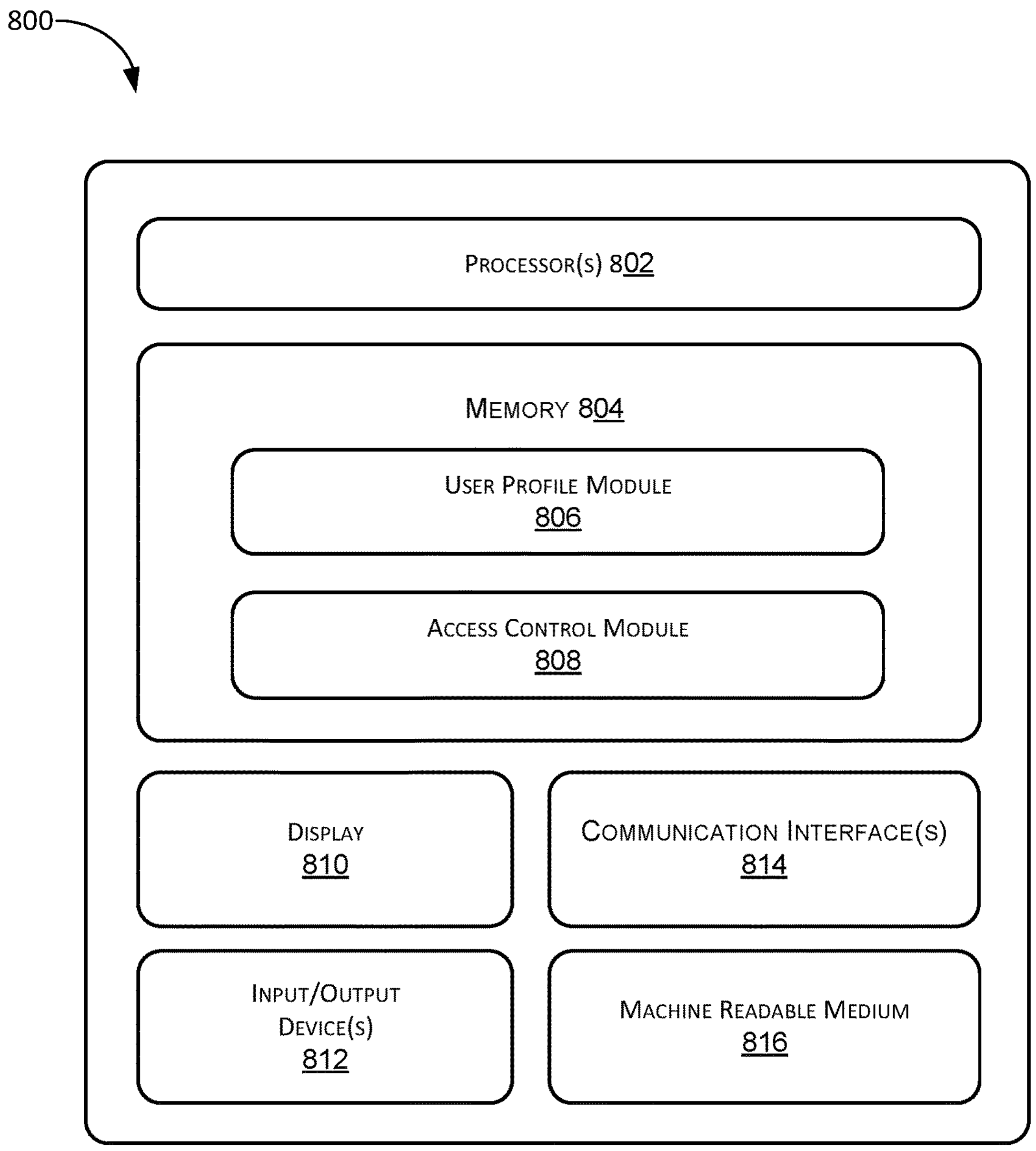
FIG. 8 illustrates an example media storage system capable of implementing the methods disclosed herein.

FIG. 8 illustrates an example media storage system 800 capable of implementing the methods disclosed herein. The example media storage system 800 may correspond to the media storage system 130, as illustrated in FIGS. 1-3.

As illustrated in FIG. 8, a media storage system 800 may comprise processor(s) 802, a memory 804 storing a user profile module 806 and an access control module 808, a display 810, input/output device(s) 812, communication interface(s) 814, and/or a machine readable medium 816.

In various examples, the processor(s) 802 can be a central processing unit (CPU), a graphics processing unit (GPU), or both CPU and GPU, or any other type of processing unit. Each of the one or more processor(s) 802 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 802 may also be responsible for executing all computer applications stored in memory 804, which can be associated with common types of volatile (RAM) and/or nonvolatile (ROM) memory.

In various examples, the memory 804 can include system memory, which may be volatile (such as RAM), non-volatile (such as ROM, flash memory, etc.) or some combination of the two. The memory 804 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the media storage system 800. Any such non-transitory computer-readable media may be part of the media storage system 800.

The user profile module 806 may perform at least some functions of the module profile module 112 of FIGS. 1-3. As discussed herein, the user profile module 806 may be configured to query the memory 804 to identify a user profile based on a profile identifier associated with a user or a device identifier associated with a user device and store a received voicemail or greeting within the user profile. The user profile module may further query the memory 804 identify a user profile based on a profile identifier associated with a user or a device identifier associated with a user device and retrieve a requested voicemail or greeting from the user profile. The access control module 808 may perform at least some functions of the module access control module 118 of FIGS. 1-3. As discussed herein, the access control module 118 may be configured to query the memory 804 to determine whether a user has access to the memory 804 based on one or more of a credential (e.g., PIN) provided by the user, a device identifier associated with a user device, or a profile identifier associated with the user.

The communication interface(s) 814 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 814 can be compatible with multiple radio access technologies, such as 5G radio access technologies and 4G/LTE radio access technologies. Accordingly, the communication interfaces 814 can allow the media storage system 800 to connect to the 5G system described herein.

Display 810 can be a liquid crystal display or any other type of display commonly used in the media storage system 800. For example, display 810 may be a touch-sensitive display screen and can then also act as an input device or keypad, such as for providing a soft-key keyboard, navigation buttons, or any other type of input. Input/output device(s) 812 can include any sort of output devices known in the art, such as display 810, speakers, a vibrating mechanism, and/or a tactile feedback mechanism. Input/output device(s) 812 can also include ports for one or more peripheral devices, such as headphones, peripheral speakers, and/or a peripheral display. Input/output device(s) 812 can include any sort of input devices known in the art. For example, input/output device(s) 812 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 816 can store one or more sets of instructions, such as software or firmware, that embodies any one or more of the methodologies or functions described herein. The instructions can also reside, completely or at least partially, within the memory 804, processor(s) 802, and/or communication interface(s) 814 during execution thereof by media storage system 800. The memory 804 and the processor(s) 802 also can constitute machine readable media 816.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, the method comprising:
- receiving an access request from a user device of a user, wherein the access request comprises at least a device identifier associated with the user device;
- in response to determining, based at least in part on the device identifier, that the user is not registered:
  - generating a profile identifier associated with the user, and
  - storing the profile identifier and the device identifier on a media storage;
- receiving a voicemail from a mobile virtual network operator (MVNO), wherein the voicemail comprises the profile identifier associated with the user;
- determining, based at least in part on the profile identifier, that the user has access to the media storage;
- based on determining the user has access to the media storage, storing the voicemail on the media storage;
- generating a first notification based at least in part on storing the voicemail; and
- transmitting the first notification to a user device associated with the user.

2. The method of claim 1, wherein:
- the access request further comprises one or more of:
  - a PIN associated with the user device, or
  - a greeting message, and
- the method further comprises:
  - storing at least one of the PIN or the greeting message on the media storage.

3. The method of claim 1, further comprising:
- receiving, from the user device, a request to retrieve the voicemail;
- transmitting the voicemail to the user device;
- in response to transmitting the voicemail to the user device, generating a second notification; and
- transmitting the second notification to the user device.

4. The method of claim 3, prior to receiving the access request from the user device, further comprising:
- sending a PIN request to the user device;
- receiving, from the user device, a PIN associated with the user device; and
- authenticating, based at least in part on the PIN, the user associated with the user device.

5. The method of claim 1, further comprising:
- receiving, from the MVNO, a request to retrieve the voicemail;
- transmitting the voicemail to the MVNO;
- in response to transmitting the voicemail to the MVNO, generating a second notification; and
- transmitting the second notification to the user device.

6. The method of claim 1, further comprising:
- receiving a request to delete the voicemail;
- removing the voicemail from the media storage;
- in response to removing the voicemail from the media storage, generating a second notification; and
- transmitting the second notification to the user device.

7. The method of claim 1, further comprising:
- storing the profile identifier, the device identifier, a PIN associated with the user device, and a greeting message on the media storage based on determining that the user is registered with the media storage.

8. The method of claim 1, further comprising:
- receiving a request to delete the voicemail;
- removing the voicemail from the media storage;
- in response to removing the voicemail from the media storage, generating a second notification; and
- transmitting the second notification to the user device.

9. A system comprising:
- one or more processors;
- a memory; and
- one or more instructions stored in the memory and executable by the one or more processors to perform operations comprising:
  - receiving an access request from a user device of a user, wherein the access request comprises at least a device identifier associated with the user device;
  - in response to determining, based at least in part on the device identifier, that the user is not registered:
    - generating a profile identifier associated with the user, and
    - storing the profile identifier and the device identifier on a media storage;
  - receiving a voicemail from a mobile virtual network operator (MVNO), wherein the voicemail comprises the profile identifier associated with the user;
  - determining, based at least in part on the profile identifier, that the user has access to the media storage;
  - based on determining the user has access to the media storage, storing the voicemail on the media storage;
  - generating a first notification based at least in part on storing the voicemail; and
  - transmitting the first notification to a user device associated with the user.

10. The system of claim 9, wherein:
the access request further comprises one or more of:
a PIN associated with the user device, or
a greeting message, and
the operations further comprise:
storing at least one of the PIN or the greeting message on the media storage.

11. The system of claim 9, wherein the operations further comprise:
receiving, from the user device, a request to retrieve the voicemail;
transmitting the voicemail to the user device;
in response to transmitting the voicemail to the user device, generating a second notification; and
transmitting the second notification to the user device.

12. The system of claim 11, wherein the operations, prior to receiving the access request from the user device, further comprise:
sending a PIN request to the user device;
receiving, from the user device, a PIN associated with the user device; and
authenticating, based at least in part on the PIN, the user associated with the user device.

13. The system of claim 9, wherein the operations further comprise:
receiving, from the MVNO, a request to retrieve the voicemail;
transmitting the voicemail to the MVNO;
in response to transmitting the voicemail to the MVNO, generating a second notification; and
transmitting the second notification to the user device.

14. The system of claim 9, wherein the operations further comprise:
receiving a request to delete the voicemail;
removing the voicemail from the media storage;
in response to removing the voicemail from the media storage, generating a second notification; and
transmitting the second notification to the user device.

15. A non-transitory computer-readable storage medium storing computer-readable instructions, that when executed by a processor, cause the processor to perform actions comprising:
receiving an access request from a user device of a user, wherein the access request comprises at least a device identifier associated with the user device;
in response to determining, based at least in part on the device identifier, that the user is not registered:
generating a profile identifier associated with the user, and
storing the profile identifier and the device on a media storage;
receiving a voicemail from a mobile virtual network operator (MVNO), wherein the voicemail comprises the profile identifier associated with the user;
determining, based at least in part on the profile identifier, that the user has access to the media storage;
based on determining the user has access to the media storage, storing the voicemail on the media storage;
generating a first notification based at least in part on storing the voicemail; and
transmitting the first notification to a user device associated with the user.

16. The non-transitory computer-readable storage medium of claim 15, wherein:
the access request further comprises one or more of:
a PIN associated with the user device, or
a greeting message, and
the actions further comprise:
storing at least one of the PIN or the greeting message on the media storage.

17. The non-transitory computer-readable storage medium of claim 15, wherein the actions further comprise:
receiving, from the user device, a request to retrieve the voicemail;
transmitting the voicemail to the user device;
in response to transmitting the voicemail to the user device, generating a second notification; and
transmitting the second notification to the user device.

18. The non-transitory computer-readable storage medium of claim 17, wherein the actions, prior to receiving the access request from the user device, further comprise:
sending a PIN request to the user device;
receiving, from the user device, a PIN associated with the user device; and
authenticating, based at least in part on the PIN, the user associated with the user device.

19. The non-transitory computer-readable storage medium of claim 15, wherein the actions further comprise:
receiving, from the MVNO, a request to retrieve the voicemail;
transmitting the voicemail to the MVNO;
in response to transmitting the voicemail to the MVNO, generating a second notification; and
transmitting the second notification to the user device.

20. The non-transitory computer-readable storage medium of claim 15,
wherein the actions further comprise:
receiving a request to delete the voicemail;
removing the voicemail from the media storage;
in response to removing the voicemail from the media storage, generating a second notification; and
transmitting the second notification to the user device.

* * * * *